US006456916B1

(12) United States Patent
Edgar et al.

(10) Patent No.: US 6,456,916 B1
(45) Date of Patent: Sep. 24, 2002

(54) POWER CLOSURE SENSOR SYSTEM AND METHOD

(75) Inventors: Lynne Ann Edgar, Rochester, MI (US); Tejas Bhupendra Desai, Sterling Heights, MI (US); Allan D. Losey, Ortonville, MI (US); Susan Adelle Johnson, Rochester, MI (US)

(73) Assignee: Siemens VDO Automotive Corp., Auburn Hills, MI (US)

( * ) Notice: Subject to any disclaimer, the term of this patent is extended or adjusted under 35 U.S.C. 154(b) by 0 days.

(21) Appl. No.: 09/967,671

(22) Filed: Sep. 28, 2001

Related U.S. Application Data

(60) Provisional application No. 60/236,457, filed on Sep. 29, 2000.

(51) Int. Cl.⁷ .............................................. G06F 7/00
(52) U.S. Cl. ........................ 701/49; 701/36; 180/271; 280/734; 280/735; 307/9.1
(58) Field of Search .................. 701/49, 36; 180/271; 280/734, 735; 307/9.1, 10.1

(56) References Cited

U.S. PATENT DOCUMENTS

| 3,651,389 A | 3/1972 | Ito et al. ....................... 318/266 |
| 4,458,445 A | 7/1984 | Sauer et al. ....................... 49/26 |
| 5,602,734 A | 2/1997 | Kithil ................... 364/424.055 |
| 5,672,976 A | 9/1997 | Egger et al. ................. 324/668 |
| 5,691,693 A | 11/1997 | Kithil ......................... 340/439 |
| 5,751,071 A | 5/1998 | Netzer ........................ 307/10.1 |
| 5,802,479 A | 9/1998 | Kithil et al. ................... 701/45 |
| 5,844,486 A | 12/1998 | Kithil et al. ................. 340/573 |
| 6,014,602 A | 1/2000 | Kithil et al. ................... 701/45 |
| 6,348,856 B1 * | 2/2002 | Jones et al. ................. 340/10.1 |

FOREIGN PATENT DOCUMENTS

| DE | 4004353 | 8/1991 |
| GB | 2 289 332 A | 11/1995 |

OTHER PUBLICATIONS

Translation of German Patent No. 40 04 353 A1.

* cited by examiner

Primary Examiner—William A. Cuchlinski, Jr.
Assistant Examiner—Olga Hernandez

(57) ABSTRACT

A power closure sensor system is disclosed. The system includes a data processing device, a closer motor in communication with the data processing device and controlling the movement of a closable member, and a proximity sensor, configured to sense the location of an object. The proximity sensor is in communication with the data processing device. The proximity sensor is configured to communicate the location of the object with or without the object contacting either the closable member or the frame. The system also includes a position sensor configured to sense the position of the closable member. The position sensor is in communication with the data processing device. Further, the system includes a logic program running on the data processing device and the logic program is configured to generate an estimate of the location of the object relative to the closable member.

20 Claims, 3 Drawing Sheets

POWER CLOSURE SENSOR SYSTEM AND METHOD

This application claims the benefit of U.S. Provisional Patent Application No. 60/236,457, filed on Sep. 29, 2000, the entirety of which is herein incorporated by reference.

BACKGROUND

With the advent of powered closure systems, such as, but not limited to automotive windows, it would be desirable to provide a sensor system in which an object, such as but not limited to a person's hand which is in the closing path of the closable member, such as the window, is able to sense the object within the path of travel of the window and reverse direction of or halt the closing of the window. Reversing the direction would thereby prevent the hand or other object from being caught or pinched by the moving window against the window frame.

Current systems detect an object either after an object has been trapped and the motor stalls, or the position of the closure member does not change. In such systems the required force may be set too low so that it will reverse without an actual object in the opening. This could be caused by ice build up on the perimeter seal or other frictional forces that cannot be predicted by the system. Other systems may work on current or speed sensing and therefore have problems similar to the problems listed above. The majority of systems currently available actually pinch an object before reversing and in many cases could cause discomfort to a person or cause damage to an object.

Accordingly, there is a need for a system that senses an object before the actual point of contact. Further, there is a need for a system that will not trap an object prior to reversing the closer motor, instead the closer motor will reverse when it detects an object within a sensitivity range.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a power closure sensor system. The power closure sensor system includes a data processing device and a closer motor in communication with the data processing device. The closer motor controls the movement of a closable member relative to a frame. The power closure sensor system also includes a proximity sensor configured to sense the location of an object. The proximity sensor is in communication with the data processing device and the proximity sensor is configured to sense the object location when the object does or does not contact the closable member or the frame member directly. Further, the power closure sensor system includes a position sensor. The position sensor is configured to sense the position of the closable member. The position sensor is in communication with the data processing device. Further still, the power closure sensor system includes a logic program running on the data processing device. The logic program is configured to generate an estimate of the location of the object relative to the closable member.

Another exemplary embodiment relates to a method of preventing a powered closable member from closing, the closable member supported by a frame. The method includes determining the location of an object using a proximity sensor, the object not being required to have direct contact with at least one of the closable member and the frame. The method includes determining the position of the closable member, and computing the location of the closable member relative to the object. The method also includes determining that the object is within a predetermined range relative to the closable member and stopping a closing motor from advancing the closable member.

Yet another exemplary embodiment relates to a power closure sensor system for a vehicle. The power closure sensor system includes a data processing device and a closer motor in communication with the data processing device. The closer motor controls the movement of a closable member on the vehicle relative to a frame for the closable member. The power closure sensor system also includes a capacitive sensor configured to sense the location of an object. The capacitive sensor is in communication with the data processing device, the capacitive sensor enabled to sense the relative location of the object when the object does or does not touch the closable member or the frame. The power closure sensor system further includes a position sensor configured to sense the position of the closable member. The position sensor is in communication with the data processing device. Further still, the power closure sensor system further includes a logic program running on the data processing device. The logic program is configured to generate an estimate of the location of the object relative to the closable member.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED EMBODIMENTS

A power closure sensor system may be configured to use a proximity sensor to detect objects in the travel path of a window or door (for example) and to use a position sensor in the motor or drive mechanism to keep track of the window or door location. The system could determine window or door location and become more sensitive as the power closure closes the final gap. Such a system could be applied to any and all power closure devices including the following vehicle applications and more: power windows, power sliding doors, power lift gates, power deck lids, power hatchbacks, power lift glass, power tailgates, power trunk lids, power tonneau covers, powered folding passenger seats, etc.

Figure 1:
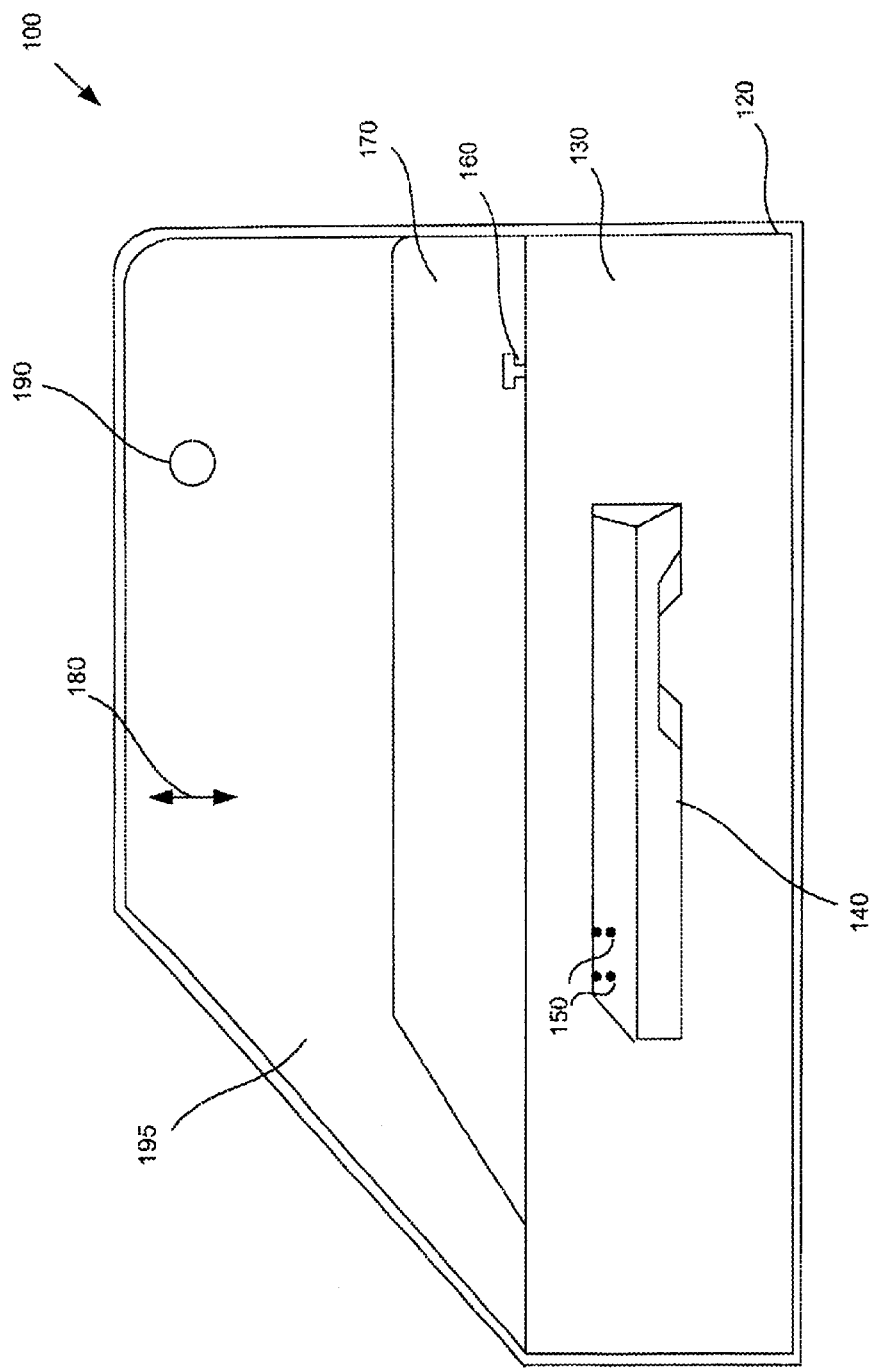
FIG. 1 is a depiction of an automotive vehicle door including an object in the path of travel of a window.

Referring now to FIG. 1, a door 100 is depicted. Door 100 may be any of a variety of doors including, but not limited to those doors and windows for automotive or other vehicles. Door 100 includes a window frame 110 which is a portion of overall door frame 120. Door frame 120 supports an interior panel 130 having an arm rest 140. Arm rest 140 may include a plurality of control buttons and/or switches 150 for controlling such items in the interior of a vehicle such as, but not limited to powered window opening and closing, power door locks, etc. Door 100 may also include a door lock mechanism 160 and a powered window 170.

Powered window 170 may be controlled by switches 150. A motor or other powered transport mechanism may be included within door 100 hidden behind interior panel 130, for example. Closer motor, window motor, or transport mechanism within door 100 is utilized to move window 170 in the up or down directions as indicated by arrows 180.

In operation, an object 190, such as a human body part, or any other object, may be extending through opening 195 which has been created by window 170 being lowered within window frame 110. If an operator chooses to close window 170, and object 190 remains in the position shown, or in any other position extending through opening 195, it may be possible that window 170 would pinch or trap object 190 between window 170 and frame 110 without the aid of a sensing mechanism. Accordingly, in an exemplary embodiment, a power closure sensor system is utilized to sense the location of object 190 in relation to window 170. In such a situation where window 170 is coming close to contacting and/or pinching object 190 between window 170 and window frame 110, the power closure sensor system would be utilized to provide a command to the motor to either halt operation and/or to reverse direction.

Figure 2:
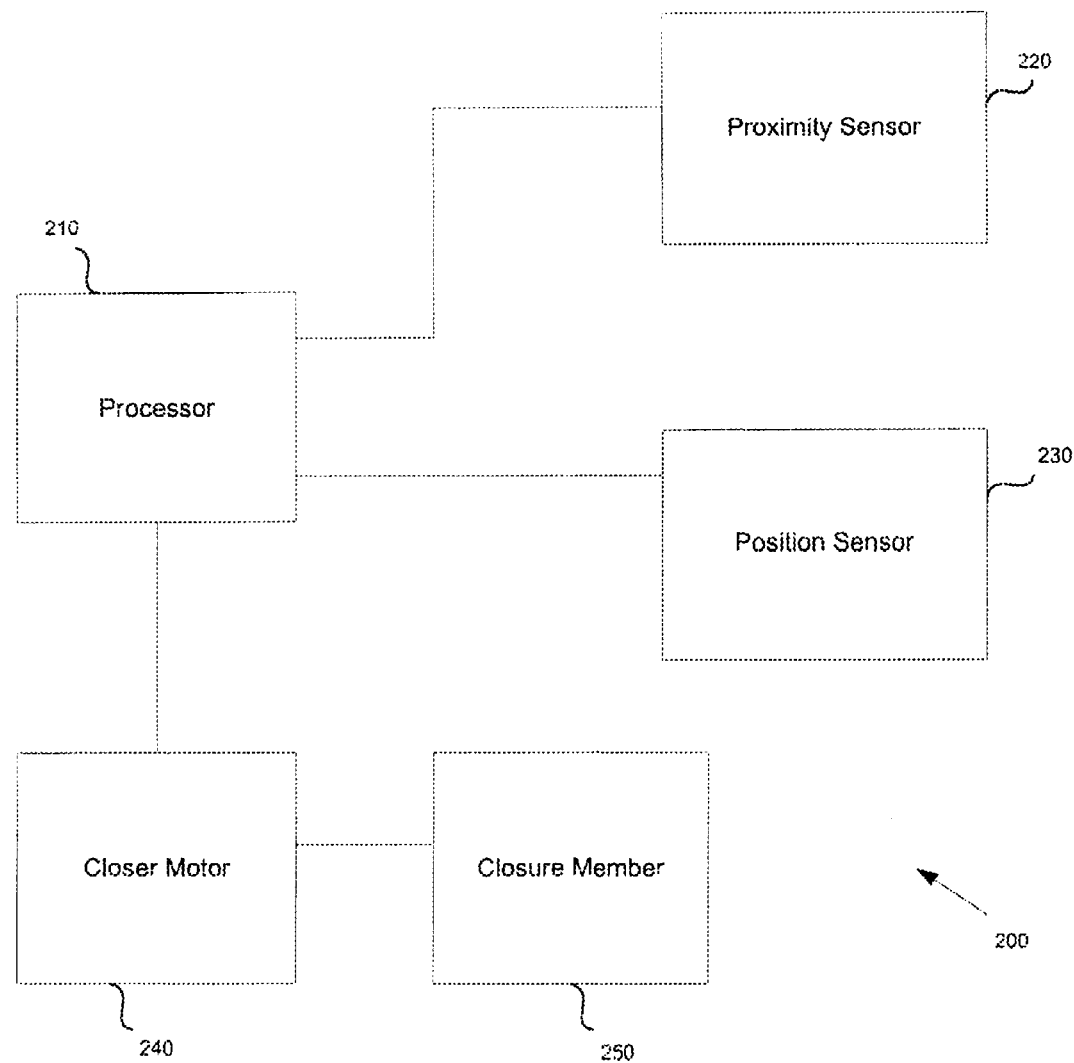
FIG. 2 is a block diagram of a window closure sensor system.

Referring now to FIG. 2, a block diagram of a power closure sensor system 200 is depicted. Power closure sensor system 200 includes a microprocessor 210 or other data processing device. Coupled to microprocessor 210 are a proximity sensor 220, a position sensor 230, and a closer motor 240. Closer motor 240 is mechanically coupled to closure member 250 (where closure member 250 may be, but is not limited to, window 170). Proximity sensor 220 may be any of a variety of sensing devices such as, but not limited to, infrared sensing devices, ultrasonic sensing devices, capacitive sensing devices, other optical sensing devices, and other electromagnetic sensing devices. Proximity sensor 220 is configured to provide an electrical signal to microprocessor 210 representative of the location of an object without requiring that the object contact either the closure member, or the frame. Position sensor 230 may be any of a variety of position sensors, such as, but not limited to, rotary potentiometer sensors, magnetic sensors, and other optical and/or electromagnetic sensors, which all are configured to provide an electrical signal representative of the relative position of closure member 250. Closer motor 240 may be any of a variety of motors or other transport systems that are used to move closure member 250 in a powered or power assisted manner. Closure member 250 may be any of a variety of closure members, such as, but not limited to, windows, doors, lids, trunk covers, sliding doors, lift gates, deck lids, hatchbacks, lift glass, tailgates, trunk lids, tonneau covers, and the like. Further, system 200 may be utilized in any of a variety of other types of situations not limited to vehicle or automotive applications, such as, but not limited to, buildings, appliances, and any other types of applications in which a powered closure mechanism is utilized.

Capacitive sensor arrays are known and have been used for a variety of sensing applications. Various variations of capacitive sensors have been used, all responding to the interference of the electric fields caused by the presence of a person or object. The capacitive sensor may include dual opposing electrodes creating an electric field between the electrodes, a single electrode which capacitively couples to the vehicle frame or other surface, a single electrode that capacitively couples to a person or object who is grounded to the vehicle, parallel electrodes which are spatially separated, dual adjacent planar electrodes where one electrode is driven by an oscillator and the adjacent electrode capacitively couples to the driven electrode to create a sensing field, among other possible configurations. Although there are a variety of different capacitive sensing devices, any sensing device which provides sensing of an object and does not require contact of the object to the closure member or the closure member's frame may be applied and remain within the scope of the claims.

In operation, proximity sensor 220 senses the location of an object. Position sensor 230 locates the position of closure member 250. Each of the readings from sensors 220 and 230 are communicated to microprocessor 210. Microprocessor 210 includes a logic program which computes an estimate of the location of the object relative to the closable member. Such logic may be in any of a variety of formats, including, but not limited to, heuristic methods, experimentally based rules, fuzzy logic, neural networks, and the like. If the program logic determines that the object is within a sensitivity range, or that the relative position of the object dictates that the object may be trapped or pinched by the closing of the closure member, microprocessor 210 sends a signal to closer motor 240 which acts to stop and/or reverse the closure motor which in turn stops or reverses the direction of closure member 250.

Figure 3:
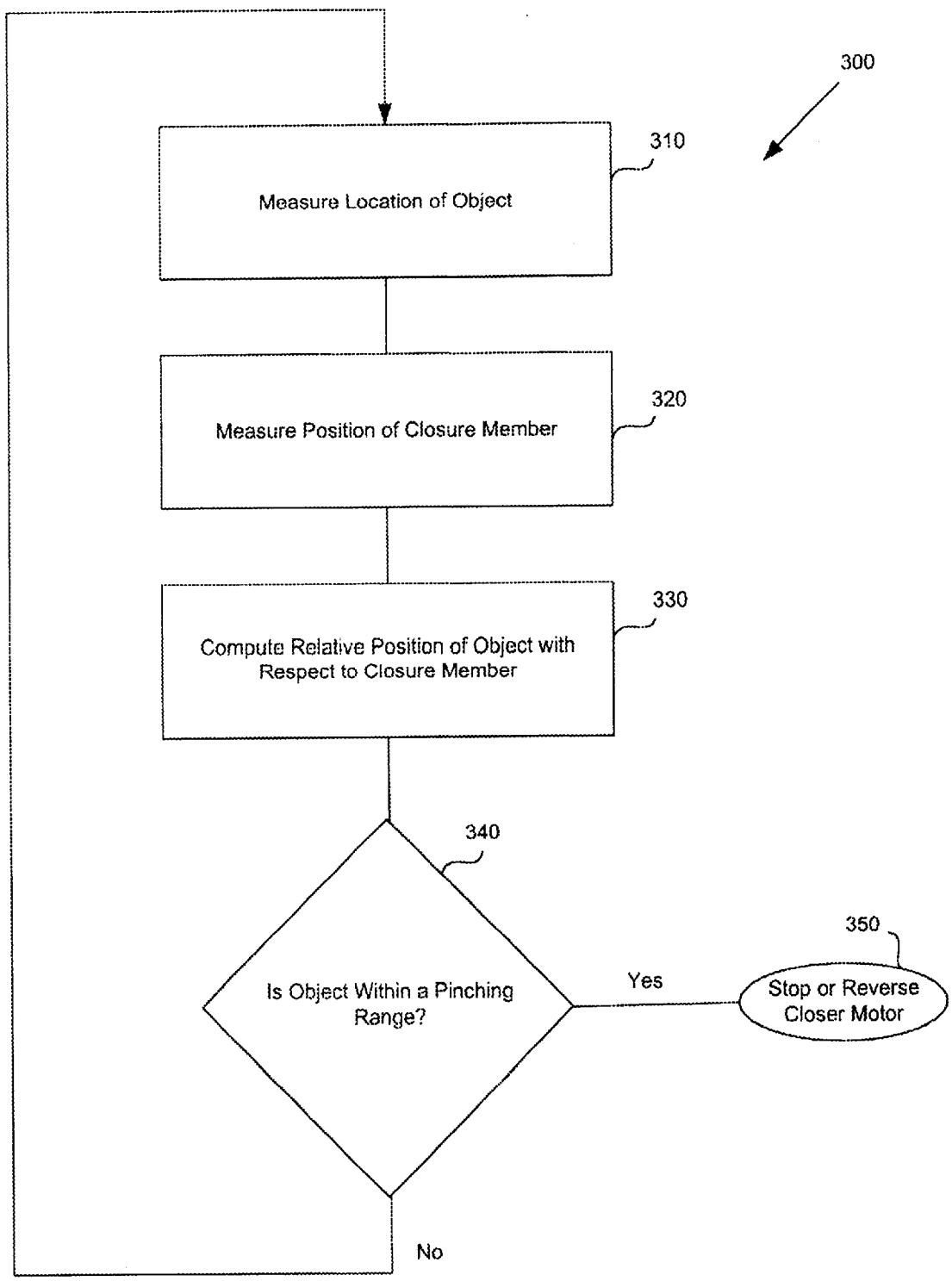
FIG. 3 is a flow diagram of a method of sensing an object in the vicinity of a powered closable member.

Referring now to FIG. 3, a flow diagram 300 of a closure sensor system process is depicted. A measurement of the location of an object is made (step 310) by proximity sensor 220. Further, a measurement of the position of closure member 250 (step 320) is made by position sensor 230. These measurements are communicated to microprocessor 210 and the relative position of the object with respect to the closure member 240 is computed (step 330). A decision is then made in microprocessor 210 as to whether the object is within a certain sensitivity range such as whether the object is within a pinching range (step 340). If the object is determined to be within a pinching range, the closer motor 240 is commanded to stop (step 350) and/or to reverse direction. However, if the object is determined to be outside of the pinching range, the position of the object is continued to be monitored and new measurements of the object are taken in step 310 and the process is repeated.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A power closure sensor system, comprising:
  a data processing device;
  a closer motor in communication with the data processing device and controlling the movement of a closable member relative to a frame;

a proximity sensor, configured to sense the location of an object, the proximity sensor in communication with the data processing device and the proximity sensor configured to sense the object location when the object does or does not contact the closable member or the frame member directly;

a position sensor, configured to sense the position of the closable member, the position sensor in communication with the data processing device; and a logic program running on the data processing device and configured to generate an estimate of the location of the object relative to the closable member.

2. The power closure sensor system of claim 1, wherein the closable member is a vehicle window.

3. The power closure sensor system of claim 1, wherein the closable member is a vehicle door.

4. The power closure sensor system of claim 1, wherein the proximity sensor is a capacitive sensor.

5. The power closure sensor system of claim 1, wherein the proximity sensor is an infrared sensor.

6. The power closure sensor system of claim 1, wherein the logic program includes a neural network.

7. The power closure sensor system of claim 1, wherein the logic program includes a fuzzy logic program.

8. A method of preventing a powered closable member from closing, the closable member supported by a frame comprising:

determining the location of an object using a proximity sensor, the object not being required to have direct contact with at least one of the closable member and the frame;

determining the position of the closable member;

computing the location of the closable member relative to the object;

determining that the object is within a predetermined range relative to the closable member;

stopping a closing motor from advancing the closable member.

9. The method of claim 8, wherein the closable member is a vehicle window.

10. The method of claim 8, wherein the closable member is a vehicle door.

11. The method of claim 8, wherein the proximity sensor is a capacitive sensor.

12. The method of claim 8, wherein the proximity sensor is an infrared sensor.

13. The method of claim 8, wherein the logic program includes a neural network.

14. The method of claim 8, wherein the logic program includes a fuzzy logic program.

15. A power closure sensor system for a vehicle, comprising:

a data processing device;

a closer motor in communication with the data processing device and controlling the movement of a closable member on the vehicle relative to a frame for the closable member;

a capacitive sensor, configured to sense the location of an object, the capacitive sensor in communication with the data processing device, the capacitive sensor enabled to sense the relative location of the object when the object does or does not touch the closable member or the frame;

a position sensor, configured to sense the position of the closable member, the position sensor in communication with the data processing device; and a logic program running on the data processing device and configured to generate an estimate of the location of the object relative to the closable member.

16. The power closure sensor system of claim 15, wherein the closable member is a vehicle window.

17. The power closure sensor system of claim 15, wherein the closable member is a vehicle door.

18. The power closure sensor system of claim 15, wherein the logic program includes a neural network.

19. The power closure sensor system of claim 15, wherein the logic program includes a fuzzy logic program.

20. The power closure sensor system of claim 15, wherein the estimate of the location of the object is compared with a sensitivity range to determine whether closing of the closable member should be terminated.

* * * * *